C. R. PRATT.
MEANS FOR CONTROLLING AND SYNCHRONIZING FLUID GEARS.
APPLICATION FILED APR. 15, 1909.
1,211,961.
Patented Jan. 9, 1917.
5 SHEETS—SHEET 2.
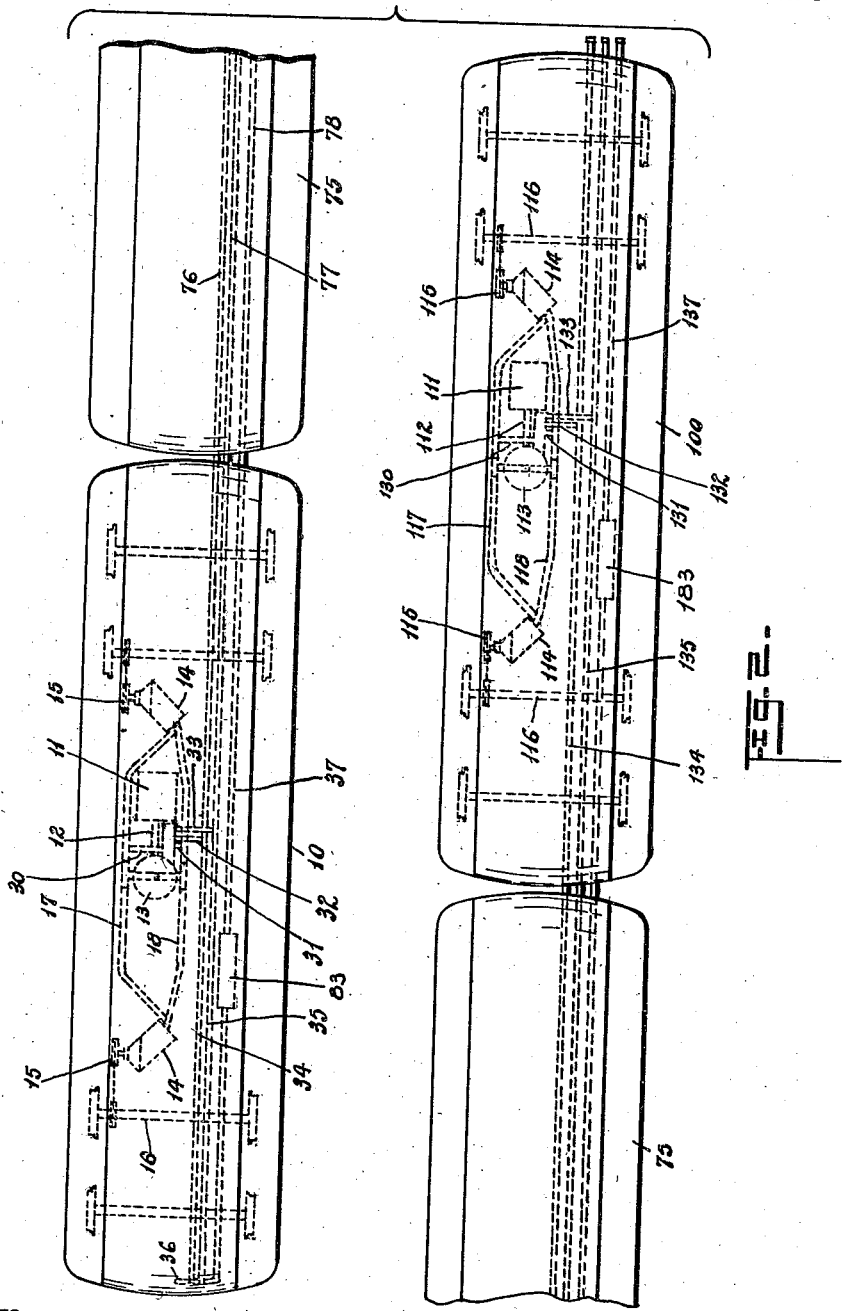
WITNESSES
INVENTOR
Charles R. Pratt,
BY
ATTORNEY.

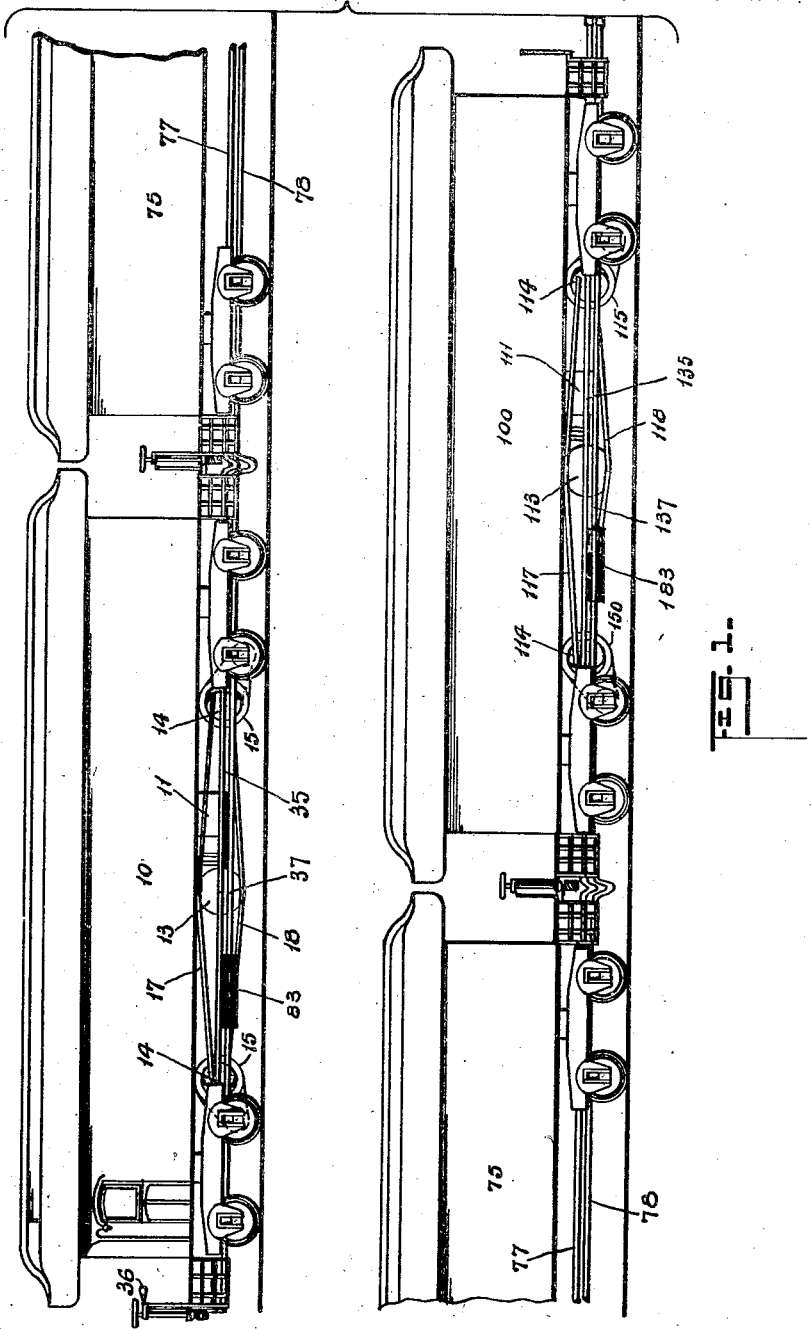

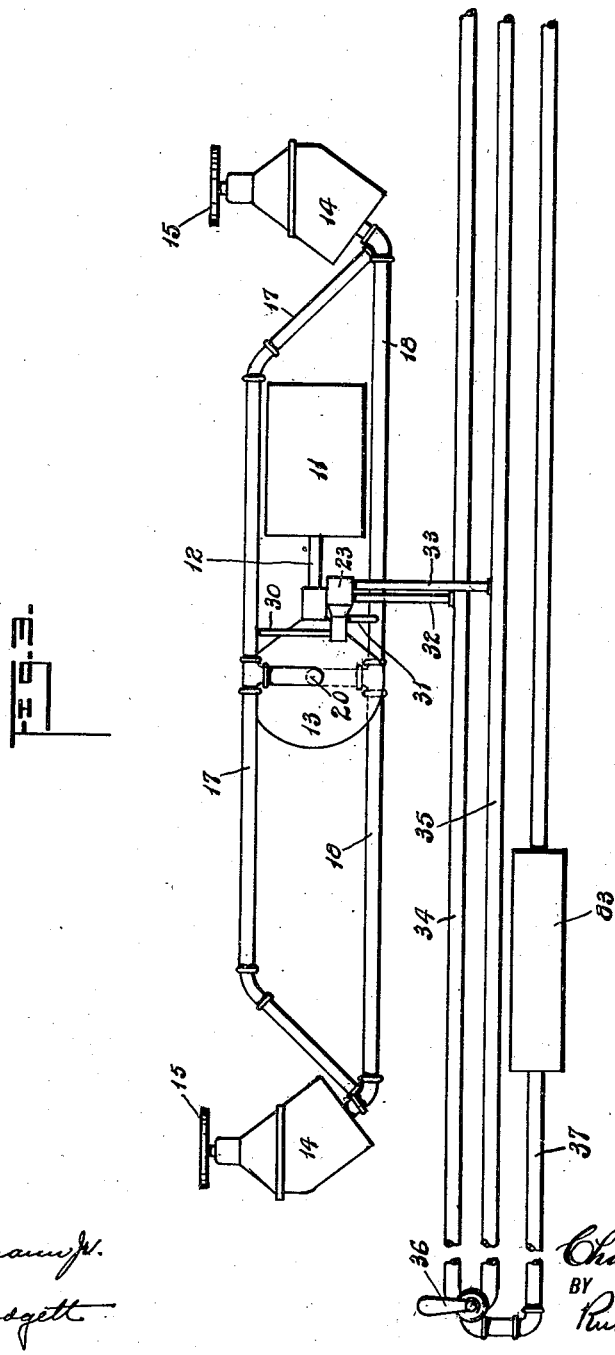

C. R. PRATT.
MEANS FOR CONTROLLING AND SYNCHRONIZING FLUID GEARS.
APPLICATION FILED APR. 15, 1909.
1,211,961.
Patented Jan. 9, 1917.
5 SHEETS—SHEET 4.
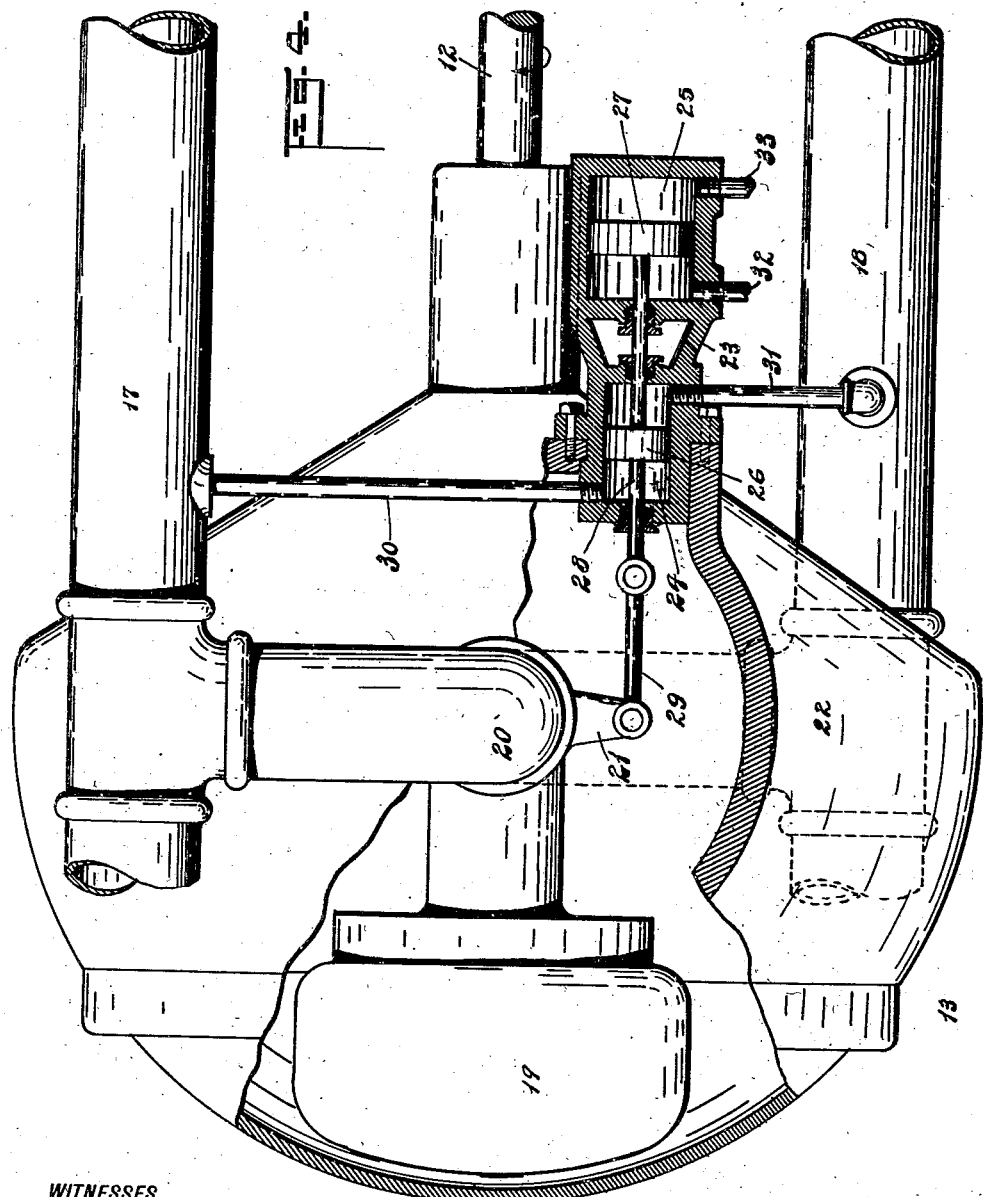

C. R. PRATT.
MEANS FOR CONTROLLING AND SYNCHRONIZING FLUID GEARS.
APPLICATION FILED APR. 15, 1909.
1,211,961.
Patented Jan. 9, 1917.
5 SHEETS—SHEET 5.
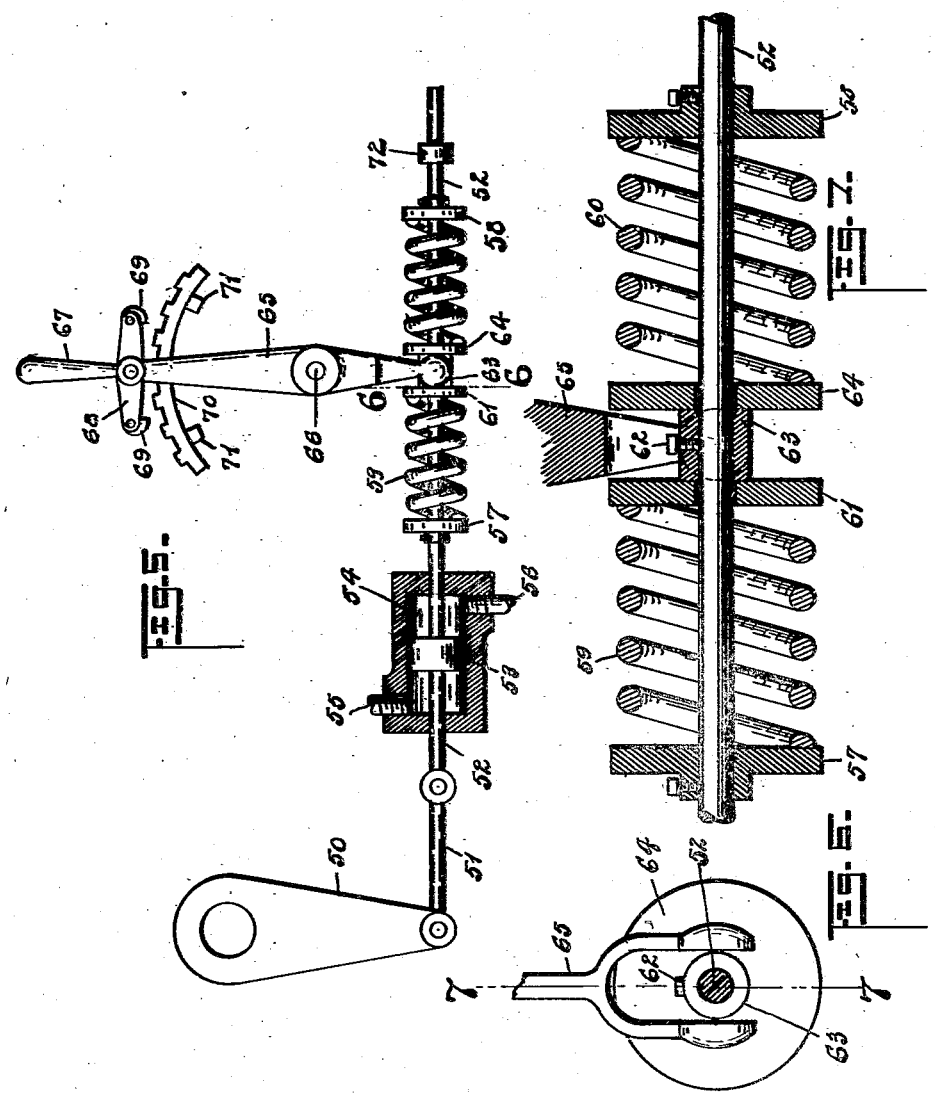
WITNESSES
INVENTOR
Charles R. Pratt,
BY
Russell M. Everett,
ATTORNEY.

UNITED STATES PATENT OFFICE.

CHARLES R. PRATT, OF MONTCLAIR, NEW JERSEY, ASSIGNOR TO UNIVERSAL SPEED CONTROL COMPANY, A CORPORATION OF NEW YORK.

MEANS FOR CONTROLLING AND SYNCHRONIZING FLUID-GEARS.

1,211,961.  Specification of Letters Patent.  Patented Jan. 9, 1917.

Application filed April 15, 1909. Serial No. 489,976.

*To all whom it may concern:*

Be it known that I, CHARLES R. PRATT, a citizen of the United States, residing at Montclair, in the county of Essex and State of New Jersey, have invented certain Improvements in Means for Controlling and Synchronizing Fluid - Gears, of which the following is a specification.

This invention relates to those means for transmitting power, and varying the speed or direction of rotation, which are commonly known as fluid gears, each comprising a pump member and a motor member. There are many types of these fluid gears, and the present invention does not depend upon any particular type, although for purposes of illustration I have shown the fluid gear set forth in the co-pending application of Holbrook F. J. Porter, filed December 28, 1908, Serial Number 469,696. I have illustrated my invention in connection with the pump member of said Porter fluid gear, although it will be understood that in many fluid gears "pump member" and "motor member" are relative terms which are used rather to signify the direction of transmission of power than for the distinction of any constructional differences. Motor members may by reversing the direction of transmission become pump members, and "pump member" as used herein means only the member from which power is transmitted to another member, thus including every member which could be used for that purpose.

The objects of the invention are to enable the pump member of a fluid gear to be controlled by a pressure opposed to the pressure generated by said member, to thus automatically regulate or govern the pressure of the pump member and prevent any possibility of its getting too high; to enable such automatic regulation to be effected by the pressure of the pump member reacting against a predetermined yielding pressure; to govern the pump member by a direct and absolute feature of itself,—to wit, the pressure transmitted by it; to secure an automatically perfect acceleration; to enable the operator to disregard regulation by hand, and simply throw on the full control pressure in starting or stopping; to enable the controlling pressure to be applied to the pump members of separated fluid gears; to thus enable separated fluid gears to be controlled in absolute synchronism, and a plurality or train of fluid gears to be operated as a unit; to thus enable a plurality of motors, such as the motors of the series of cars in a motor-car train to be operated in perfect synchronism; to secure a constant torque on all the driving wheels of such a train and thus overcome inertia by a perfect acceleration from stop to full speed, or in retarding or stopping the train; to enable a motor-car train to be started and stopped in the least possible time and distance, by making said constant torque equal to the maximum normal traction, with no strain on the motive power and with no shock or discomfort to the passengers; to provide means by which electric motors, gas engines or the like can start a railway train with unlimited power and with no demand upon the motors of more than the normal torque at full speed; to return to the source of power, in an electric system, a large portion of the energy generated in stopping a train or in retarding it on down grade, and to obtain other advantages and results as may be brought out in the following description.

Referring to the accompanying drawings, in which like numerals of reference indicate corresponding parts in each of the several figures, Figure 1 is a side elevation of a train of three cars equipped according to the present invention; Fig. 2 is a plan of the same; Fig. 3 is a plan of the driving motor, fluid gear and controlling mechanism of a single car, on larger scale and detached from the car; Fig. 4 is a plan, on still larger scale, of the pump member of one of the fluid gears, showing my improved controlling means therefor in central section; Fig. 5 is a plan of a slightly modified construction of controlling means in which springs are employed instead of fluid-pressure; Fig. 6 is a cross-sectional view of the same on line 6—6, Fig. 5, and Fig. 7 is a longitudinal section taken on line 7—7, Fig. 6.

In said drawings, 10, 75 and 100 indicate railway cars, which are taken as typical representations of any kind of vehicles adapted to be driven in trains. The first and last cars of the train, that is, those numbered 10 and 100, I have shown as motor cars or cars supplied with propelling means involving fluid gears, while the middle car 75 is a trailer or car propelled entirely by the other two. This is the usual arrangement of a motor car train, that is, every other car being a motor car, irrespective of the number of cars in the train, and its advantage over a train of cars pulled by a locomotive is increased traction for quick starts and stops, distributed traction to pull long trains around sharp curves, greater power for high speeds, better adapted for high speeds, less strain and wear on the rails. The propelling means which I have shown on the cars 10 and 100 are alike and similar parts bear reference numerals whose first two places, reading from the right-hand toward the left, are the same. A description of one of these cars will suffice for both, and the car 10 will be described. Upon said car 10 is mounted a motor 11, which may be an electric motor, gas engine or any type of motor ordinarily employed for producing power. This motor serves to rotate the shaft or prime mover 12 of the pump member 13 of a fluid gear and the motor members 14 of which drive sprocket wheels 15, from which power is transmitted to the axles 16 of the car 10. The entire fluid gear herein shown is fully set forth in the said pending application of Holbrook F. J. Porter above referred to, and to which reference may be had for the detail construction, it not being essential to my invention what particular fluid gear is employed.

17, 18 indicate pipes connecting the pump member 13 with the motor members 14, one of said pipes serving as a flow pipe to the motor members and the other as a return, according to the direction in which the motor member of the fluid gear is being driven.

It will be understood that the speed and direction of pumping by the pump member are controlled by varying the piston stroke, which is done by shifting a certain part of the pump, such part in the Porter fluid gear which I have shown being the cylinder carried by the swinging carrier 19. This carrier 19, as shown in plan by Fig. 4, swings horizontally from right to left upon a vertical axis, the center of said movement being at 20, and such movement is effected by means of an arm 21 which projects from said carrier radially with respect to the said center 20. It is to means for swinging this arm, or its equivalent in any other fluid gear, that the present invention more particularly relates, and which will next be described.

Upon the casing 22 of the pump member 13, a casting 23 is supported which provides two cylinders 24 and 25 in axial alinement with each other. Pistons 26 and 27 are arranged in said cylinders 24 and 25, respectively, upon a single piston rod 28, which piston rod is pivotally connected, as by a connecting rod 29, with the arm 21. The two cylinders 24 and 25, it will be understood, are separate and distinct, with no communication between them, and the relation of parts is such that when the arm 21 lies in neutral position, as shown in Fig. 4, the pistons 26, 27 are at or near the middles of their respective cylinders. Into the opposite ends of the small cylinder 24, and thus on opposite sides of its piston 26, lead ducts 30, 31 from the pipes 17 and 18, respectively. Thus according to which of said pipes 17 and 18 is the flow pipe and which the return pipe, pressure will be admitted to one side of the piston 24 and exhaust permitted from the other side, so that the said piston will move accordingly. For instance, with the prime mover or shaft 12 rotating constantly in the direction indicated by the arrow, if the carrier 19 is swung toward the top of Fig. 4, the pipe 17 becomes the flow pipe and the pipe 18 the return pipe, whereby pressure is exerted upon the front of the piston 26 through duct 30 and the fluid back of said piston may escape through duct 31. If the carrier 19 is swung in the opposite direction, or toward the bottom of Fig. 4, the pipe 18 becomes the flow pipe and 17 the return, and the pressure in cylinder 24 tends to drive the piston 26 forward. The piston 26 in said cylinder 24 thus always tends to return the swinging carrier 19 to its middle or neutral position. In order to overcome this tendency, and swing the carrier 19, the rear piston 27 in its cylinder 25 is actuated as follows: Into the opposite ends of the rear cylinder 25, lead branch tubes 32, 33, through either one of which compressed air may be admitted into the said cylinder, exhaust taking place through the other tube. These branch tubes 32 and 33 lead from main air tubes 34, 35, either one of which is adapted to be placed in communication, as by a valve 36, with a supply pipe 37 leading from an air compressor 83, the other tube becoming at the same time an exhaust duct. The air pressure in the said supply pipe 37 is of such pressure as acting upon the piston 27 will swing the carrier 19 to the angle necessary to give the maximum speed at minimum pressure, and in attaining said speed the operator simply turns on such air pressure to fullest extent by means of the valve 36. This admits pressure, as through branch tube 33 to piston 27, moving both the pistons 27 and 26, rods 28 and 29, and turning arm 21 to throw the carrier 19 into its extreme position so that the pump begins to deliver at its maximum capacity but minimum pressure. Since a pressure considerably above this minimum pressure is required to start the car, owing to inertia, the fluid pressure rises rapidly and by means of the duct 30 this increased pressure is communicated from the flow pipe 17 to the front end of the cylinder 24. This pressure on the front side of the piston 26 moves it back until a pressure sufficient to start the car is reached. It will be understood that the pressure admitted from supply pipe 37 through branch tube 33 into the end of the cylinder 25 is sufficient to throw the carrier 19 into full stroke position or balance the pump pressure in such position, and that as the piston 27 is moved backward by the increasing pump pressure on piston 26 as above described, the pressure in cylinder 25 increases by compression until it is substantially equal to the starting pressure and balances the pump pressure with the carrier 19 in short stroke position.

The ratio of the areas of pistons 26 and 27 and the maximum air pressure per square inch against the piston 27, determines the maximum fluid pressure delivered by the pump member 13. As the inertia of the load or car being driven is overcome, the fluid pressure against piston 26 drops, and the air pressure against the piston 27 moves said piston forward, increasing the stroke of the pump pistons, until the increased fluid pressure on piston 26 again balances the air pressure on piston 27. This action is steadily progressive, maintaining a constant torque on the driving wheels until full speed is attained. To run at slower speed or to start slowly, the operator opens the air valve 36 to less than its full capacity, so that a reduced air pressure acts against the piston 27, which reduces the pressure of fluid delivered to the motor members 14. To stop the car or transmission of power, the operator reverses the air valve 36 and admits air through branch tube 32, moving pistons 27 and 26 and rods 28 and 29 backward, causing the arm 21 to shorten the stroke of the pump pistons. This retards the speed of the motor members 14 and causes them to deliver fluid at high pressure through tube 31 against the rear of piston 26, thus opposing the motion given to arm 21 by the air through branch tube 32. As the car or load slows down, the fluid pressure against the rear of piston 26 drops, and the air pressure against the front of piston 27 moves it backward, decreasing the stroke of the pump pistons, until arm 21 is brought into neutral position. This action is steadily progressive, and the fluid pressure thus retards the train and stops it just as it started the train by perfect acceleration, in the same manner and by similar means. When the car or load is stopped, the operator brings the lever of his air valve 36 to center, cutting off air pressure from both branch tubes 32 and 33, and applies the brakes. Under this condition, if the arm 21 is not exactly in its neutral position, fluid will be pumped into the cylinder 24 through either the duct 30 or 31, bringing said arm 21 to a neutral position and the pump pistons to a zero stroke. As there is never pressure in both ducts 30 and 31 at the same time, the cylinder 24 can discharge into one while it takes pressure from the other, and the pistons 26 thus move in either direction. To reverse the direction of driving of the motor members 14 from that above described, air pressure would be admitted through branch tube 32 to the front side of piston 27, and the arm 21 and carrier 19 swung in the opposite direction from that above described. According, therefore, as the control pressure is admitted to the front or back of the control piston 27, when the carrier 19 is in neutral position, the motor members 14 will be driven in one direction or the other.

Obviously, any compressible fluid other than air can be used for operating the piston 27, and furthermore, since the other cylinder 24 contains a non-compressible fluid, there can be no violent pulsation or oscillation of the pistons 26, 27 and their piston rod.

The above-described means of controlling a fluid gear enables a series or train of separated fluid gears to be operated in perfect synchronism of their motor members, as illustrated in Figs. 1 and 2 of the drawings. Here the two main compressed air tubes 34 and 35, 76 and 77, 134 and 135 of the three cars are shown as coupled together in series between adjacent cars, as are also the supply pipes 37, 78 and 137. These pipes thus deliver to each pump the same air pressure at the same instant, and therefore the pumps on all motor cars deliver the same fluid pressure to their motors at the same instant, giving every driving wheel on all motor cars the same torque. Leaks or other differences in the pump members do not matter, therefore, nor do the inclined parts or swinging carriers of all said members have to stand at the same angle; yet all the motor members of the different fluid gears start and accelerate as a unit or single machine, all receiving the same fluid pressure at all times. Of course, however, there are the usual limits to the throw of the operating members 21, and obviously when this is reached, that is, when the train of cars is at full speed, acceleration by my improved control is not occurring. At full speed all pumps are set for equal stroke, giving equal speed to all driving wheels, and any variation between the motor-cars is still equalized, since they are all coupled together, by variation in the reaction of the load on the pump member of any too-fast motor car, which reduces the speed of that motor car by increasing pressure against the front of its piston 24. By determining the fluid pressure that will give every driving wheel a torque equal to its maximum normal traction, the train is accelerated to full speed in the least possible time and distance, with a perfect acceleration, and calling only for the normal H. P. of the electric motors or gas engines, which add their full speed momentum to aid in overcoming the inertia of the train. This acceleration is the same as a train started by gravity down a grade, the torque on these driving wheels being as constant as the force of gravity.

In retarding the train to stop it, and in checking its speed on down grades, the motor members driven by the driving wheels pump fluid into the pump member, thus making a hydraulic motor of the pump member, which in turn drives the electric motor, always at its full speed as a generator, i. e. in excess of its speed as a motor, and thereby returns to the power station about 50% of this energy, which nearly balances the energy used to accelerate to full speed, and climb grades. It should be borne in mind, however, that by this system, an electric motor-car train is accelerated to full speed at the maximum efficiency of the electric motors, whereas in the present system of starting a train, the electric motors can not deliver the required starting torque at over 10% efficiency. Also in this hydraulic system, although the hydraulic pressure is instantly pumped up to its maximum, the torsional load on the electric motor starts at zero and does not reach its maximum until the train has attained full speed, i. e. the torque on the electric motor is proportional to the length of the stroke of the pump pistons, which start at zero stroke.

If the air pressure fails when the train is at full speed, or at any speed, on an up grade, the fluid pressure from the pump returns arm 21 to center and holds the train; if on the down grade, the application of the air brakes, automatically or by the motorman, retards the hydraulic motors, and causes them to pump oil against piston 26, bringing arms 21 to center and stopping the train.

In operating a single fluid gear, mechanical means for establishing the fixed controlling pressure, instead of the compressible fluid pressure described, may be provided in the form of springs, as shown in Figs. 5–7, inclusive. Here the swinging carrier arm 50 is joined by a connecting rod 51 to a piston rod 52 having fast upon itself a single piston 53 in a cylinder 54, to the opposite ends of which ducts 55 and 56 lead from the flow and return pipes (not shown) of the fluid gear, as in the case of the cylinder 24 above described. Beyond the said cylinder 54, the piston rod 52 has fast upon itself separated stops 57 and 58, and between the said stops are helical springs 59, 60 upon the piston rod. At the adjacent ends of said springs are plates 61, 64 which are slidably loose upon the piston rod, and adapted to be normally forced by the springs 59, 60 against the opposite ends of a sleeve 63 made fast upon the piston rod, as by a set screw 62. Straddling the said fixed sleeve, between the plates 61, 64 is the forked end of a controlling lever 65, said lever being pivoted as at 66 and adapted to be swung by its other end 67 as a handle. By throwing said lever 65 in either direction, one of the spiral springs 59, 60 is compressed and energy thereby stored to swing the arm 50 under the balancing action of the pressure in the pump member of the fluid gear against the piston 53. Obviously, the action is precisely similar to that before described in connection with the compressed air control.

In order that the lever 65 may not have to be held in the position to which it is thrown to get the desired constant pressure from the pump member, a detent 68 is pivoted upon said lever, with hooked ends 69, either of which is adapted to be pressed into engagement with a curved rack 70 when the lever 65 has been thrown. Stops 71 are provided to limit the movement of said lever in both directions. A bearing 72 is shown for the rear end of the piston rod 52. Obviously, by this construction, and by limiting the control pressure when compressed air is used, it is impossible for an operator to get a too high or dangerous pressure in the fluid gear pump member, and the necessity for by-pass or relief valve is eliminated.

Having thus described the invention, what I claim is:

1. The combination with a plurality of fluid gears each having a pump member, of means for maintaining equal products of fluid pressure and velocity in all of said pump members while permitting the fluid pressure and velocity to vary.

2. The combination with a plurality of fluid gears each having a pump member, of means for maintaining equal products of fluid pressure and velocity in all of said pump members while permitting the fluid pressure and velocity to vary, and means for predetermining said equal products.

3. The combination with a plurality of fluid gears each having a pump member, and means for regulating the velocity and pressure of fluid pumped and reversing the direction of flow of the same of means for maintaining equal products of fluid pressure and velocity in all of said pump members.

4. The combination with a pump for producing pressure, and means for varying the velocity and volume of fluid pumped, said means comprising an operating member, of means for moving said operating member in either direction, and means adapted to be operated by the fluid pressure of the pump for opposing said movement, whereby the fluid pressure of the pump may be maintained in constant proportion to the pressure of said means for moving said operating member.

5. The combination with a pump for producing pressure, and means for varying the velocity and volume of fluid pumped, said means comprising an operating member, of means for applying a yielding pressure to said operating member and releasing it therefrom, and means adapted to be operated by the fluid pressure of the pump for opposing said movement, whereby the fluid pressure of the pump may be maintained in constant predetermined proportion to the pressure of said means for moving said operating member.

6. The combination with a pump for producing pressure, and means for varying the velocity and volume of fluid pumped, said means comprising an operating member, of means for applying a yielding pressure to said operating member and releasing it therefrom, and means adapted to be operated by the fluid pressure of the pump for opposing movement of said member.

7. The combination with a pump for producing pressure, and means for varying the velocity and volume of fluid pumped, said means comprising an operating member, of compressed air means for moving said operating member, and means adapted to be operated by the fluid pressure of the pump for opposing said movement.

8. The combination with a pump for producing pressure, and means for varying the velocity and volume of fluid pumped, said means comprising an operating member, of two cylinders, pistons in said cylinders, and rods connecting said pistons to said operating member, means for conducting fluid from the pump to one cylinder, and means for introducing an independent fluid under pressure into the other cylinder.

9. The combination with a pump for producing pressure, and means for varying the velocity and volume of fluid pumped, said means comprising an operating member, of two cylinders, pistons in said cylinders, and rods connecting said pistons to said operating member, means for conducting fluid from the pump to one cylinder, and means for applying a predetermined yielding pressure to the piston in the other cylinder.

10. The combination with a pump for producing pressure, and means for varying the velocity and volume of fluid pumped, said means comprising an operating member, of two cylinders, pistons in said cylinders, and rods connecting said pistons to said operating member, means for conducting fluid from the pump to one cylinder, and means for introducing a constant air pressure into the other cylinder in opposition to said fluid pressure.

11. The combination with a cylinder, a piston in said cylinder, and means for varying the stroke of said piston, said means comprising an operating member, of means for moving said operating member in either direction, and means adapted to be operated by the fluid pressure of the pump for opposing such movement of the operating member.

12. The combination with a cylinder, a piston in said cylinder, and means for varying the stroke of said piston, said means comprising an operating member, of means for moving said operating member in either direction, and means adapted to be operated by the fluid pressure of the pump for opposing such movement of the operating member, said means for moving the operating member being adapted one to move it yieldingly and the other unyieldingly.

13. The combination with a cylinder, a piston in said cylinder, and means for varying the stroke of said piston, said means comprising an operating member, of means for moving the operating member in either direction, and means operated by the fluid pressure of the pump piston for moving said operating member in the other direction.

14. The combination with a cylinder, a piston in said cylinder and means for varying the stroke of said piston, said means comprising an operating member, of means for applying a yielding pressure to said operating member to move it in either direction, and means adapted to be operated by the fluid pressure of the pump for opposing movement of said member.

15. The combination with a cylinder, a piston in said cylinder, and means for varying the stroke of said piston, said means comprising an operating member, of compressed air means for moving said operating member, and means adapted to be operated by the fluid pressure of the pump for opposing said movement.

16. The combination with a cylinder, a piston in said cylinder, and means for varying the stroke of said piston, said means comprising an operating member, of two control cylinders, pistons in said control cylinders, and rods connecting said pistons to said operating member, means for conducting fluid from the first mentioned cylinder to one control cylinder, and means for introducing an independent fluid under pressure into the other control cylinder.

17. The combination with a cylinder, a piston in said cylinder, and means for varying the stroke of said piston, said means comprising an operating member, of two control cylinders, pistons in said control cylinders, and rods connecting said pistons to said operating member, means for conducting fluid from the first mentioned cylinder to one control cylinder, and means for applying a predetermined yielding pressure to the piston in the other cylinder.

18. The combination with a cylinder, a piston in said cylinder, and means for varying the stroke of said piston, said means comprising an operating member, of two control cylinders, pistons in said control cylinders, and rods connecting said pistons to said operating member, means for conducting fluid from the first mentioned cylinder to one control cylinder, and means for introducing a constant air-pressure into the other cylinder in opposition to said fluid pressure.

19. The combination with a pump for producing pressure and means for varying the velocity and volume of the fluid pumped, said means comprising an operating member, of two cylinders arranged in alinement, pistons in said cylinders, a piston rod for said pistons, a connecting rod connecting said piston rod to said operating member, means for conducting the pump pressure to one piston, and means for conducting an independent pressure to the other piston.

20. The combination with a pump for producing pressure and means for varying the velocity and volume of the fluid pumped, said means comprising an operating member, of two cylinders arranged in alinement, pistons in said cylinders, a piston rod for said pistons, a connecting rod connecting said piston rod to said operating member, means for conducting the pump pressure to one piston, and means for conducting a compressible gas into the other cylinder.

21. The combination with a pump for producing pressure and means for varying the velocity and volume of the fluid pumped, said means comprising an operating member, of two cylinders arranged in alinement, pistons in said cylinders, a piston rod for said pistons, a connecting rod connecting said piston rod to said operating member, means for conducting the pump pressure to one piston, and means for conducting a compressible gas into the other cylinder at a constant predetermined pressure.

22. The combination with a pump for producing pressure and means for varying the velocity and volume of the fluid pumped, said means comprising an operating member, of two cylinders arranged in alinement, pistons in said cylinders, a piston rod for said pistons, a connecting rod connecting said piston rod to said operating member, means for conducting the pump pressure to one piston, and means for introducing compressed air at a constant predetermined pressure into the other cylinder in opposition to said pump pressure.

23. The combination with a pump for producing pressure and means for varying the velocity and volume of the fluid pumped, said means comprising an operating member, of two cylinders arranged in alinement, pistons in said cylinders, a piston rod for said pistons, a connecting rod connecting said piston rod to said operating member, means for conducting the pump pressure to either side of one piston, and means for conducting a compressible gas to either side of the other piston.

24. The combination with a plurality of fluid gears, of a control for each of said fluid gears, means for conducting the pressure of each fluid gear to its said control, and means for operating said controls from a single source.

25. The combination with a plurality of fluid gears, of a compressed air control for each of said fluid gears, means for conducting the pressure of each fluid gear to its said control, and a single duct for leading compressed air to all said controls.

26. The combination with a fluid gear, and a controlling member for said gear, of two independent cylinders, pistons in said cylinders connected to said controlling member, means for conducting pressure from the pump member of said fluid gear to one of said pistons, and means for supplying compressed air to the other piston.

27. The combination with a fluid gear, and a controlling member for said gear, of two independent cylinders, pistons in said cylinders connected with said controlling member, ducts leading from the pump member of said fluid gear to the opposite ends of one of said cylinders, other ducts leading to the opposite end of the other cylinder, and means for supplying compressed air to either of said last mentioned ducts and exhausting from the other.

28. The combination with a plurality of fluid gears, and controlling members for each of said fluid gears, of two independent cylinders for each fluid gear, pistons in said cylinders connected to the controlling member of that fluid gear, ducts leading from the pump member of each fluid gear to the opposite ends of one of its said cylinders, other ducts, one having branches leading to one end of all the other cylinders and the other having branches leading to their opposite ends, and means for supplying compressed air to either of said last mentioned ducts and exhausting from the other.

29. The combination of a variable speed gear, a manually operatable control mechanism therefor, and an automatic means governed by the load on said gear, said means being operatable simultaneously with said control mechanism to vary the speed ratio of said gear.

30. The combination of a variable speed gear consisting of a driving and a driven member, and means for varying their speed ratio, and an automatic means governed by the load on said driven member for varying the speed ratio of said members, said automatic means being operatable simultaneously with said control mechanism and operating to reduce the speed of said driven member upon increases in load.

31. The combination with a variable speed gear comprising a driving and a driven member of a control member therefor operatable at will to vary the speed ratio of said members, and means governed by the load on said gear to shift said control member to reduce the speed of the driven member of said gear whenever the load thereon exceeds the load that can be driven at the speed selected without requiring more than a predetermined power.

CHARLES R. PRATT.

In the presence of—
  RUSSELL M. EVERETT,
  FRANCES E. BLODGETT.